(12) United States Patent
Zimmer et al.

(10) Patent No.: US 10,601,955 B2
(45) Date of Patent: Mar. 24, 2020

(54) DISTRIBUTED AND REDUNDANT FIRMWARE EVALUATION

(71) Applicant: Intel Corporation, Santa Clara, CA (US)

(72) Inventors: Vincent J. Zimmer, Federal Way, WA (US); Rajesh Poornachandran, Portland, OR (US); Ned M. Smith, Beaverton, OR (US); Mingqiu Sun, Beaverton, OR (US); Gopinatth Selvaraje, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 15/428,274

(22) Filed: Feb. 9, 2017

(65) Prior Publication Data
US 2018/0227391 A1 Aug. 9, 2018

(51) Int. Cl.
*H04L 29/08* (2006.01)
*H04L 29/06* (2006.01)
*H04L 12/24* (2006.01)

(52) U.S. Cl.
CPC ............ *H04L 67/34* (2013.01); *H04L 41/082* (2013.01); *H04L 63/123* (2013.01); *H04L 63/1433* (2013.01)

(58) Field of Classification Search
USPC ........................................................ 709/230
See application file for complete search history.

(56) References Cited

U.S. PATENT DOCUMENTS

| 8,972,973 | B2* | 3/2015 | Cavalaris | G06F 8/654 717/172 |
| 2005/0114687 | A1* | 5/2005 | Zimmer | G06F 9/4401 713/193 |
| 2011/0119664 | A1* | 5/2011 | Kimura | G06F 8/60 717/173 |

(Continued)

OTHER PUBLICATIONS

Barker, Elaine, "Suite B Cryptography", retrieved from <http://csrc.nist.gov/groups/SMA/ispab/documents/minutes/2006-03/E_Barker-March2006-ISPAB.pdf>, Mar. 22, 2006, 16 Pages.

(Continued)

*Primary Examiner* — Brian Whipple
*Assistant Examiner* — John Fan
(74) *Attorney, Agent, or Firm* — Barnes & Thornburg LLP (57) ABSTRACT

An automated method for distributed and redundant firmware evaluation involves using a first interface that is provided by system firmware of a client device to obtain, at an evaluation server, a first firmware resource table (FRT) from the client device. The evaluation server also uses a second interface that is provided by a component of the client device other than the system firmware to obtain a second FRT from the client device. The evaluation server automatically uses the first and second FRTs to identify a trustworthy FRT among the first and second FRTs. The evaluation server automatically uses the trustworthy FRT to determine whether the client device should be updated. For instance, the evaluation server may automatically use the trustworthy FRT to determine whether firmware in the client device should be updated. Other embodiments are described and claimed.

25 Claims, 5 Drawing Sheets

(56) References Cited

U.S. PATENT DOCUMENTS

| | | | | |
|---|---|---|---|---|
| 2014/0007067 A1* | 1/2014 | Nelson | .................... | G06F 8/665 |
| | | | | 717/168 |
| 2014/0007069 A1* | 1/2014 | Cavalaris | ................ | G06F 8/654 |
| | | | | 717/170 |
| 2016/0034305 A1* | 2/2016 | Shear | .................... | G06F 16/245 |
| | | | | 707/722 |

OTHER PUBLICATIONS

Edfeldt, David, "Leveraging Windows Update to Distribute Firmware Updates Model Based Servicing (MBS)", retrieved from <http://www.uefi.org/sites/default/files/resources/2014_UEFI_Plugfest_07_Microsoft.pdf>, May 2014, pp. 1-17 Pages.

ESRT, "ESRT Table Definition", retrieved from <https://msdn.microsoft.com/en-us/windows/hardware/drivers/bringup/esrt-table-definition> on Dec. 7, 2016, 5 Pages.

Intel, "Intel® Active Management Technology (Intel® AMT) Start Here Guide (Intel AMT 9.0)", retrieved from <https://software.intel.com/en-us/articles/intel-active-management-technology-start-here-guide-intel-amt-9> on Dec. 8, 2016, 6 Pages.

Intel, "With Intel® AMT Power Management and Redirection, are Wake-on-LAN and PXE Boot Still Needed?", retrieved from <https://www.symantec.com/connect/articles/intel-amt-power-management-and-redirection-are-wake-lan-and-pxe-boot-still-needed>, Jul. 9, 2007, 4 Pages.

Mendelsohn, Tom, "Secure Boot Snafu: Microsoft Leaks Backdoor Key, Firmware Flung Wide Open", retrieved from <http://arstechnica.com/security/2016/08/microsoft-secure-boot-firmware-snafu-leaks-golden-key> on Dec. 6, 2016, 5 Pages.

Microsoft, "Learning to Rank Using Classification and Gradient Boosting", retrieved from <https://www.microsoft.com/en-us/research/publication/learning-to-rank-using-classification-and-gradient-boosting>, Jan. 1, 2008, 3 Pages.

Oleksiuk, "My Aimful Life", retrieved from <http://blog.cr4.sh/2016/06/exploring-and-exploiting-lenovo.html>, on Dec. 6, 2016, 36 Pages.

Poornachandran et al., "Premises-Aware Security and Policy Orchestration", U.S. Appl. No. 14/560,141, filed Dec. 4, 2014, 45 Pages.

Poornachandran et al., "Techniques for Persistent Firmware Transfer Monitoring", U.S. Appl. No. 15/393,198, filed Dec. 28, 2016, 43 Pages.

UEFI, "UEFI 2.5 ESRT in Linux 4.2", Firmware Security, retrieved from <https://firmwaresecurity.com/tag/efi-system-resource-table> on Dec. 7, 2016, 2 Pages.

UEFI, "UEFI Plugfest 2015—Challenges for UEFI and the Cloud", retrieved from <https://firmware.intel.com/sites/default/files/resources/UEFI_Plugfest_2015_Challenges_in_the_Cloud_Whitepaper_0.pdf>, May 2015, pp. 1-35.

UEFI, "UEFI Revocation List File", Unified Extensible Firmware Interface Forum, retrieved from <http://www.uefi.org/revocationlistfile> on Nov. 22, 2016, 2 Pages.

UEFI, "Windows UEFI Firmware Update Plattorm", retrieved from <https://msdn.microsoft.com/en-us/windows/hardware/drivers/bringup/windows-uefi-firmware-update-platform> on Dec. 6, 2016, 3 Pages.

Wikipedia, "Byzantine Fault Tolerance", retrieved from <https://en.wikipedia.org/wiki/Byzantine_fault_tolerance> on Nov. 22, 2016, 6 Pages.

Wikipedia, "Fwupd", retrieved from <https://en.wikipedia.org/wiki/Fwupd> on Dec. 6, 2016, 2 Pages.

Wikipedia, "Gradient Boosting", retrieved from <https://en.wikipedia.org/wiki/Gradient_boosting> on Nov. 22, 2016, 6 Pages.

Wikipedia, "Learning to Rank", retrieved from <https://en.wikipedia.org/wiki/Learning_to_rank> on Nov. 22, 2016, 10 Pages.

Wikipedia, "Preboot Execution Environment", retrieved from <https://en.wikipedia.org/wiki/Preboot_Execution_Environment> on Dec. 9, 2016, 6 Pages.

Wikipedia, "Software versioning", retrieved from <https://en.wikipedia.org/wiki/Software_versioning> on Jan. 17, 2017, 13 Pages.

Wikipedia, "System Management Mode", retrieved from <https://en.wikipedia.org/wiki/System_Management_Mode> on Dec. 19, 2016, 4 Pages.

Wikipedia, "Trusted Execution Environment", retrieved from <https://en.wikipedia.org/wiki/Trusted_execution_environment> on Jan. 17, 2017, 6 Pages.

\* cited by examiner

DISTRIBUTED AND REDUNDANT FIRMWARE EVALUATION

TECHNICAL FIELD

This disclosure pertains in general to firmware management for data processing systems. In particular, this disclosure pertains to methods and apparatus to facilitate accurate evaluation of firmware resources in a data processing system, potentially along with proper updating of one or more of those firmware resources, even though the data processing system might have been tampered with.

BACKGROUND

A data processing system may include hardware and software components. The hardware components may be considered the lowest level components, and when the data processing system is booted, the software components may then establish a succession of execution environments at successively higher levels. For instance, firmware may execute directly on top of the hardware to create a low-level or first-level execution environment, a virtual machine monitor (VMM) may execute on top of the firmware to create a second-level environment, an operating system (OS) may execute on top of the VMM to create a third-level environment, and user applications may execute on top of the OS.

The firmware in a data processing system may include a system firmware package to establish a basic input/output system (BIOS), along with individual device firmware packages for one or more distinct hardware components in the data processing system. The device firmware packages may include respective firmware packages for a video card, for a mass storage device, and for a network interface, for example. A firmware package may also be referred to as a "firmware module," as a "firmware resource," or simply as "firmware."

The system firmware may maintain a database to identify some or all of the firmware modules in the data processing system. For instance, the system firmware may comply with the Unified Extensible Firmware Interface (UEFI) specification, and the system firmware may use a so-called "Extensible Firmware Interface (EFI) system resource table (ESRT) to identify some or all of the firmware modules in the data processing system. The data processing system may use the ESRT to manage firmware updates.

DESCRIPTION OF EMBODIMENTS

As indicated above, the system firmware in a data processing system may maintain a database to identify some or all of the firmware modules in the data processing system. For purposes of this disclosure, a database in a data processing system with version information for multiple different firmware modules for multiple different components in that data processing system may be referred to as a "firmware resource table" (FRT). Components such as the system firmware and the OS may use the FRT to manage firmware updates.

However, if an unauthorized entity were to tamper with the FRT or with the system firmware, the data processing system might not be able to accurately identify the current firmware modules, and the data processing system might not be able to properly update those modules. For example, if a hacker were to tamper with the FRT, the system firmware, the VMM, or the OS, the data processing system might not be able to accurately identify the current firmware modules, and the data processing system might not be able to properly update those modules. For instance, a hacker might be able to use system management mode (SMM) to circumvent protections built in to components such as the system firmware or the OS.

As described in greater detail below, the present disclosure introduces methods and apparatus to facilitate (a) accurate evaluation of firmware resources in a data processing system, potentially along with (b) proper updating of one or more of those firmware resources, even though the data processing system might have been tampered with. Thus, the technology described herein may be used to combat tampering with components such as the FRT, the system firmware, and the OS. In particular, as described in greater detail below, the present disclosure describes technology for distributed and redundant firmware evaluation.

Figure 1:
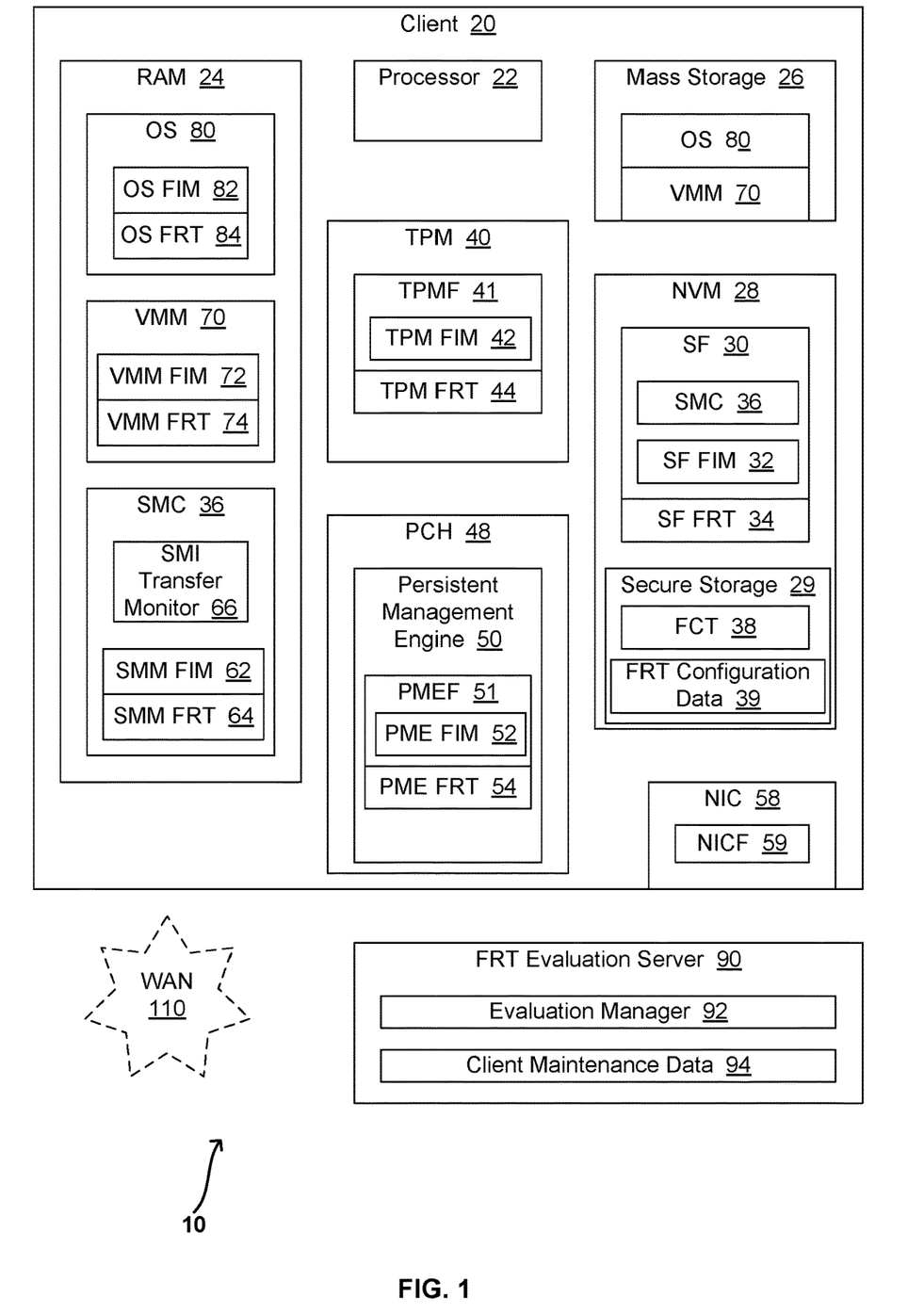
FIG. 1 is a block diagram of an example embodiment of a distributed data processing system that provides for distributed and redundant firmware evaluation.

FIG. 1 is a block diagram of an example embodiment of a distributed data processing system (DDPS) 10 that provides for distributed and redundant firmware evaluation. In the embodiment of FIG. 1, DDPS 10 includes a client device 20 and a remote FRT evaluation server 90. Client device 20 may be referred to simply as "client" 20, and remote FRT evaluation server 90 may be referred to simply as "evaluation server 90." Client 20 and evaluation server 90 may communicate with each other using any suitable approach or combination of approaches, including via a wide area network (WAN) 110 such as the Internet, via a local area network (LAN), etc. Evaluation server 90 may be referred to as "remote" because it is external to client device 20. Nevertheless, evaluation server 90 and client device 20 may be located in the same facility. For instance, a DDPS may include an evaluation server and hundreds of client devices operating together in a data center. Alternatively, one or more of the client devices may be located a great distance from the evaluation server.

Client 20 includes various hardware components, such as a main processor 22 in communication with random access memory (RAM) 24, mass storage 26, nonvolatile memory (NVM) 28, a trusted platform module (TPM) 40, a platform controller hub (PCH) 48, and at least one network interface controller (NIC) 58. Main processor 22 may also be referred to as a "central processing unit" (CPU) or simple as "processor" 22, and some embodiments may include multiple CPUs.

Client 20 also includes a persistent management engine (PME) 50. In one embodiment, PME 50 resides in PCH 48. PME 50 may be implemented with the technology provided by Intel Corporation under the name or trademark Intel® Active Management Technology (Intel® AMT). For instance, PME 50 may use the technology provided by Intel Corporation under the name or trademark Intel® Manageability Engine (Intel® ME). Other embodiments may use other kinds of PMEs.

Mass storage 26 may include software components such as a VMM 70 and an OS 80. As illustrated, processor 20 may copy some or all of those software components into RAM 24 for execution. Processor 22 may also execute some instructions, such as certain instructions from the system firmware, in an area of RAM 24 dedicated to system management mode (SMM). The instructions or code that runs in SMM may be referred to as "system management code" (SMC) 36.

Client 20 may also include various different types of firmware modules, including without limitation the following types or instances: BIOS, baseboard management controller (BMC), management engine (ME), network interface controller (NIC), TPM, mass storage, microcode, complex programmable logic device (CPLD), etc. The BIOS firmware module may also be referred to as "system firmware" (SF) 30, and it may reside in NVM 28, as illustrated in FIG. 1. SF 30 may operate more or less according to the UEFI specification in the embodiment of FIG. 1. The system firmware in other embodiments may operate differently.

The firmware module for TPM 40 may be referred to as "TPM firmware" (TPMF) 41. The firmware module for PME 50 may be referred to as "PME firmware" (PMEF) 51. The firmware module for NIC 58 may be referred to as "NIC firmware" (NICF) 59. And other devices may also include firmware modules. In an alternative embodiment, the firmware for one or more devices may reside in the NVM. Alternatively, the firmware module for one or more devices may reside partially in that device and partially in the NVM.

SF 30 may maintain an FRT that identifies some or all of the firmware modules in client 20. The FRT that is maintained by SF 30 may be referred to as an "SF FRT" 34. SF FRT 34 may include some or all of the data that a conventional ESRT would contain, including a global unique identifier (GUID) for each updateable firmware module. A table definition and additional details concerning a conventional ESRT are currently available on the Internet at msdn.microsoft.com/en-us/windows/hardware/drivers/bringup/esrt-table-definition. That table definition explains, for instance, that the GUID in an ESRT entry "identifies a firmware component that can be updated via update capsule. This GUID will be passed into the UEFI update capsule run-time service as the update capsule header's CapsuleGuid parameter during update."

In the embodiment of FIG. 1, SF FRT 34 includes entries with information for each of the firmware modules in client 20, including system firmware modules and device firmware modules. The entries for system firmware modules and device firmware modules may include the same types of items. At least some entries describe firmware resources that can be targeted by a firmware update package. For instance, the entry for SF 30 may include without limitation the following items:
- a firmware-type identifier to identify the type of module as system firmware (rather than as device firmware, as a UEFI driver, or as unknown);
- a GUID for the SF 30;
- a current-version identifier to identify the currently installed version of SF 30; and
- the date of installation for the current version of SF 30.

Furthermore, an FRT according to the present disclosure may include additional information.

For instance, SF FRT 34 may include GUIDs for old versions of firmware, the date for each firmware update, the date for each FRT update, hash values and error-correcting codes (ECCs) for firmware modules, etc. In one embodiment, SF FRT 34 serves as a firmware versioning archive (FVA). That FVA may identify the sequence of changes (upgrades or downgrades) for each specific component, with a record indicating when each change happened and how each change was initiated (e.g., via BIOS, OS, VMM, etc.). The FVA may also include details on components in addition to the component that was changed. Those details may include the version of the BIOS, the version of the OS, etc. Accordingly, SF FRT 34 may be used to identify and trace any tampering or unexpected behavior, with regard to the specific combination of components in place at any particular time.

SF 30 may publish the GUIDs, the versions, and other information for the updateable elements to enable components such as OS 80 to obtain that information. For instance, SF 30 may include an FRT interface module (FIM) 32 that provides an interface into SF FRT 34. OS 80 may use that interface to obtain GUIDs, version information, etc. For instance, OS 80 may use a so-called "UpdateCapsule" call to check the current firmware version of each module. OS 80 or other components may check the firmware version to determine whether client 20 has firmware with the latest security features to combat malware, for instance. However, if malware has tampered with SF FRT 34, SF FRT 34 might not accurately reflect the currently installed version of one or more firmware modules.

However, according to the present disclosure, in addition to SF FRT 34, client 20 includes one or more additional FRTs. Those additional FRTs (or that additional FRT) may be referred to as "redundant FRTs." If client 20 has not been tampered with, the redundant FRTs may match SF FRT 34. Moreover, if tampering has rendered one or more of the FRTs inaccurate or unreliable, one or more other FRTs may still be accurate.

The redundant FRTs may be managed by device firmware or by other software components, such as SMC 36, VMM 70, and OS 80. For instance, in the embodiment of FIG. 1, TPM 40 includes a TPM FRT 44, PME 50 includes a PME FRT 54, SMC 36 includes an SMM FRT 64, VMM 70 includes a VMM FRT 74, and OS 80 includes an OS FRT 84. And if client 20 has not been tampered with, each of those redundant FRTs should match SF FRT 34. As illustrated, some FRTs (e.g., SF FRT 34) may reside in nonvolatile storage, and others (e.g., OS FRT 84) may reside in volatile storage. Any suitable storage technology may be used in various embodiments. Also, as described in greater detail below, one or more components may keep multiple versions of the FRT, for record keeping. Additional details on how each different component manages its copy of the FRT are provided below, with regard to FIGS. 4A and 4B. As described in greater detail below, the FRTs may be used to manage firmware updates.

Each component that manages an FRT may include an FIM to provide an interface for other components to access that FRT. For instance, as indicated above, SF 30 may include SF FIM 32. Similarly, TPMF 41 may include a TPM FIM 42, PMEF 51 may include a PME FIM 52, SMC 36 may include an SMM FIM 62, VMM 70 may include a VMM FIM 72, and OS 80 may include an OS FIM 82. As described in greater detail below, some or all of the FIMs may also enable other components to update one or more of the firmware modules. In addition, as described below, client 20 may contain an FRT configuration table (FCT) 38 to identify the different FRTs and FIMs. In the embodiment of FIG. 1, FCT 38 resides in secure storage 29.

Client 20 may also include FRT configuration data 39, which may specify static policies for client 20 to use when managing the various FRTs and such. In one embodiment, the manufacturer of client 20 provisions FRT configuration data 39 into secure storage 29 during the manufacturing process.

Client 20 may include technology to prevent secure storage 29 from unauthorized access. For instance, client 20 may only allow secure storage 29 to be accessed from a trusted execution environment (TEE). Additionally, the technology in client 20 may prevent software outside of the TEE from accessing data in the TEE. A TEE may thus provide an isolated execution environment. In one embodiment, to create and utilize a TEE, a device may use the technology provided by Intel Corporation under the name or trademark "Intel Software Guard Extensions" or "Intel SGX." In another embodiment, to create and utilize a TEE, a device may use the technology provided by ARM Ltd. under the name or trademark "ARM TrustZone." In other embodiments, devices may use alternative technologies to create and utilize TEEs.

In the embodiment of FIG. 1, secure storage 29 is a dedicated, tamper-resistant portion of NVM 28 that is only accessible to software executing in the TEE of the platform. Secure storage 29 can be provisioned with appropriate policies during the manufacturing process and then some or all of secure storage 29 (e.g., FCT 38 and FRT configuration data 39) can be configured as read-only, to prevent tampering by any other entities. In other embodiments, FCT 38 and FRT configuration data 39 may reside in other types of tamper-resistant storage, such as storage that can only be accessed or updated from a TEE.

In addition, as described in greater detail below, evaluation server 90 may use two or more different FIMs to obtain two or more different copies or versions of the FRT from client 20. Evaluation server 90 may then use those versions to facilitate accurate firmware updates. For instance, evaluation server 90 may evaluate the different versions of the FRT to determine which (if any) have been compromised and which (if any) have not. Since evaluation server 90 is remote from or external to client 20, the relevant operations of evaluation server 90 may be referred to as "distributed firmware evaluation" or "remote firmware evaluation." And since multiple different copies or versions of the FRT are used, the FRT evaluation process may be referred to as "redundant firmware evaluation." Thus, DDPS 10 provides for distributed and redundant firmware evaluation.

Figure 2:
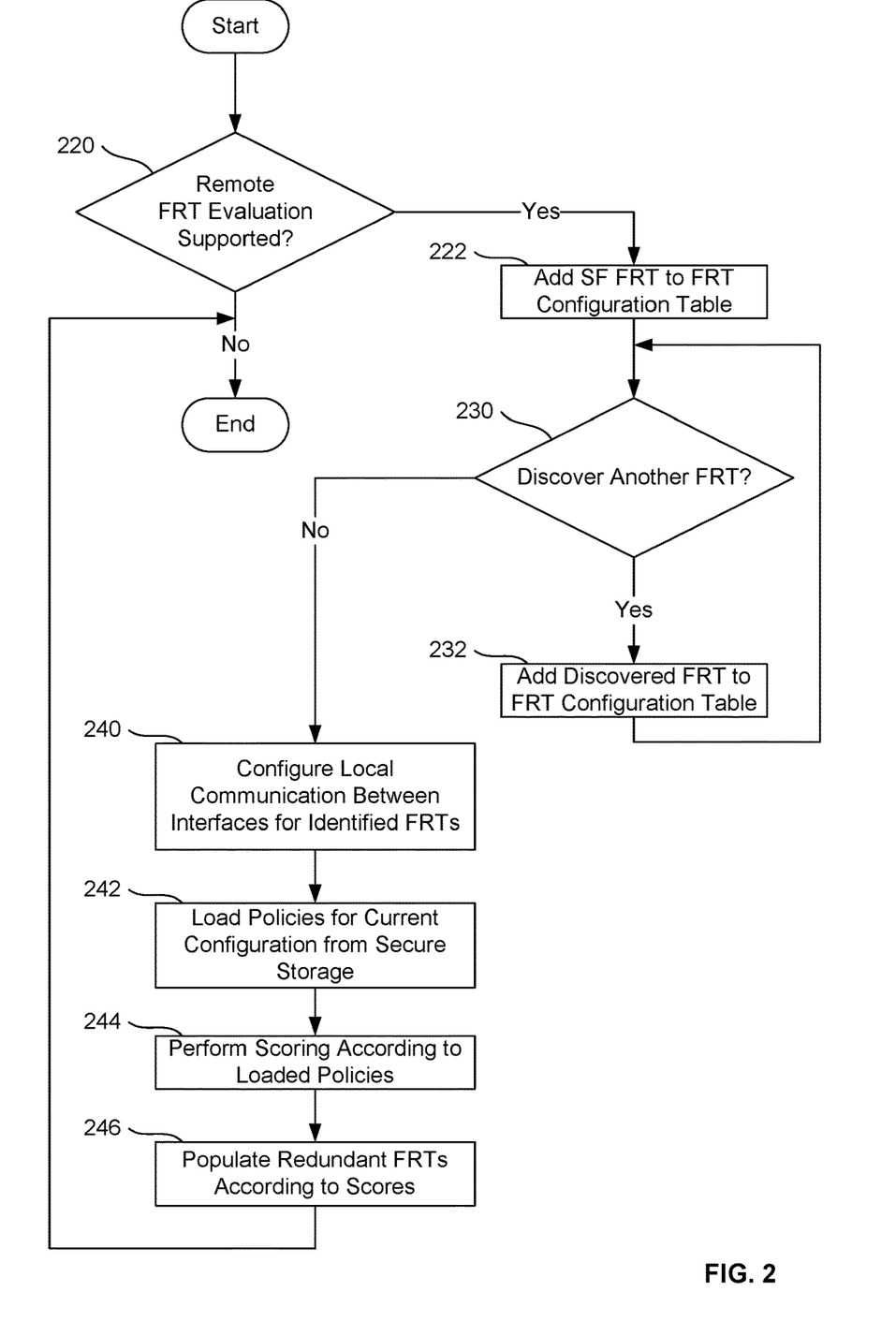
FIG. 2 presents a flowchart of an example process for configuring the client device of FIG. 1 to provide for distributed and redundant firmware evaluation.

FIG. 2 presents a flowchart of an example process for configuring device 20 to provide for distributed and redundant firmware evaluation. SF 30 in client 20 may execute this process based at least in part on policies specified in FRT configuration data 39. Client 20 may execute this process once during initial platform configuration in a factory or during first boot, for instance. In one embodiment, SF 30 executes the operations of FIG. 2 after populating SF FRT 34 with data reflecting the original configuration of client 20.

As shown at block 220, the process FIG. 2 may start with SF 30 determining whether client 20 supports remote or redundant FRT evaluation. If remote or redundant FRT evaluation is not supported, the configuration process may end.

If remote or redundant FRT evaluation is supported, SF 30 may then create or update FCT 38 with an entry for SF 30 that identifies SF FIM 32 and SF FRT 34, as shown at block 222. For instance, SF 30 may add a GUID for SF FIM 32 and a GUID for SF FRT 34 to the entry in FCT 38 for SF 30. As shown at block 230, SF 30 may then determine whether any additional components of client 20 are configured to provide FRTs. For instance, FRT configuration data 39 may identify all of the components that are configured to provide FRTs. For purposes of this disclosure, the components that are configured to provide FRTs may be referred to as "FRT-enabled components." As shown at block 232, SF 30 may then add an entry to FCT 38 for the next FRT-enabled component. That entry may identify the relevant component while including the GUIDs for that component's FRT and FIM. The process may then loop through blocks 230 and 232 until SF 30 has populated FCT 38 with data for all of the FRT-enabled components. Thus, SF 30 may populate FCT 38 with identifiers for TPM FIM 42, TPM FRT 44, PME FIM 52, PME FRT 54, SMM FIM 62, SMM FRT 64, VMM FIM 72, VMM FRT 74, OS FIM 82, and OS FRT 84.

Once SF 30 has finished populating FCT 38 with the FRT and FIM identifiers, SF 30 may configure local communication between the interfaces for the identified FRTs, as shown at block 240. In other words, SF 30 may establish communication channels between the FRT-enabled components. As shown at block 242, SF 30 may then load appropriate policies from secure storage for the current configuration. Those policies may come from FRT configuration data 39, for instance. As shown at block 244, SF 30 may then perform scoring based on those policies. As shown at block 246, SF 30 may then use the configured communication channels and the relevant FIMs to populate the redundant FRTs, according to the scoring results.

For instance, FRT configuration data 39 may specify a scoring policy that, during the first boot of client 20, SF FRT 34 should be scored as follows:
  passing if (a) FCT 38 matches a factory-provisioned reference FCT or (b) FCT 38 matches with a reference stored in evaluation server 90 and
  failing if one or more entries in FCT 38 fails respective validation.

FRT configuration data 39 may also specify an enforcement policy that, during the first boot of client 20, a copy of SF FRT 34 should be loaded into each of the other FRTs in response to a passing score, but the other FRTs should be left empty in response to a failing score. Furthermore, in one embodiment, the code from SF 30 for performing the above operations may execute in a TEE.

Once local communication channels have been established between the different components (e.g., between SF 30, TPM 40, PME 50, SMC 36, VMM 70, and OS 80), those components can use those channels to initially communicate and agree on an initial FRT, to provide a common starting point during configuration.

The configuration process may then end.

Figure 3:
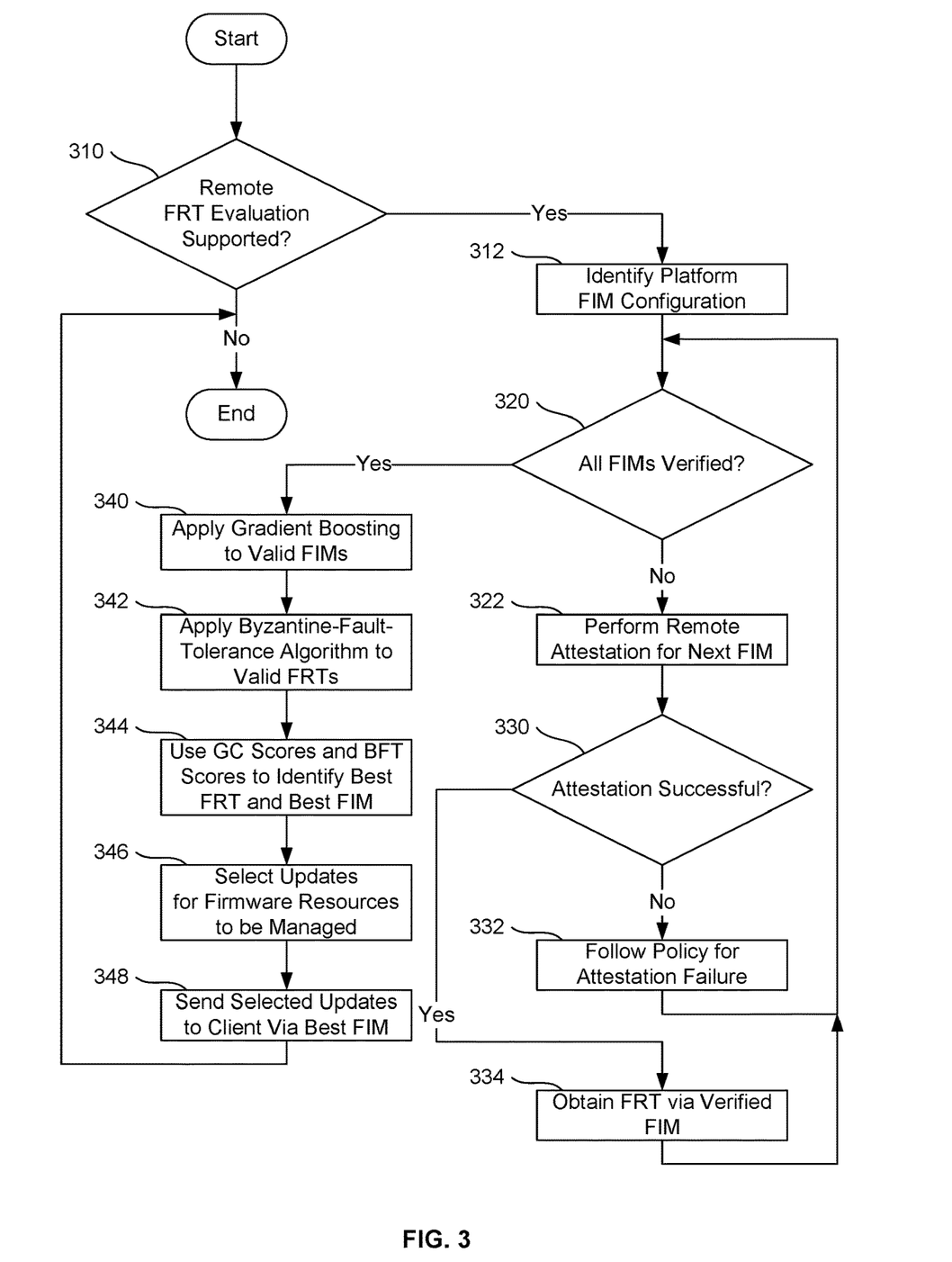
FIG. 3 presents a flowchart of an example process for managing firmware resources in the client device of FIG. 1, primarily from the perspective of an evaluation server.

FIG. 3 presents a flowchart of an example process for managing firmware resources in client 20, primarily from the perspective of evaluation server 90. For instance, evaluation server 90 may use the illustrated process to identify a trustworthy FRT and a trustworthy FIM, and evaluation server 90 may then use that FRT and the FIM to supply one or more firmware updates to one or more component in client 20. Accordingly, the process of FIG. 3 (and similar processes) may be referred to in general as a "remote platform evaluation" process (or "RPE process"). Like client 20, evaluation server 90 may include one or more processors, RAM, mass storage, one or more NICs, etc. To perform the RPE process, evaluation server 90 may execute an evaluation manager 92 on one or more of the processors. Evaluation server 90 may also include client maintenance data 94 that evaluation manager 92 uses to manage client 20 and other clients. Client maintenance data 94 may include information to identify (a) the newest versions of various firmware modules, (b) security problems associated with firmware modules, configuration settings, or other components that may reside on one or more clients, and (c) any other suitable data to assist with evaluating and updating client devices. For instance, client maintenance data 94 may include data to identify boundaries for different locations or geographical zones (or "geos"). For purposes of this disclosure, data pertaining to location may be referred to as "geo data" or "geo-fence attributes" or the like.

In one embodiment, evaluation server 90 uses the illustrated operations to serve as a cloud-based decision point. Evaluation server 90 may execute the RPE process after client 20 has finished the initial configuration process, as described above with regard to FIG. 2. Also, evaluation server 90 may use the RPE process to provide both in-band firmware updates (e.g., when client 20 is awake) and out-of-band (OOB) firmware updates (e.g., when client 20 is asleep).

In some instances, evaluations and updates can follow a push model. For instance, evaluation server 90 may decide to push updates based on discovered vulnerabilities in specific firmware components that are known or discovered to reside on specific clients. In other instances, evaluations and updates can follow a pull model, in response to requests from clients. For example, evaluation server 90 may execute the RPE process to provide an in-band update in response to a call from a component of client 20 (e.g., SF 30, PME 50, OS 80) which asks evaluation server 90 (a) to supply the calling component with a trustworthy FRT for client 20 or (b) to provide related assistance, with regard to firmware management. Evaluation server 90 may even provide client 20 with an in-band update when client 20 is in a pre-OS state. For example, a pre-OS component of client 20 (e.g., SF 30) may be configured to use a pre-OS network stack (e.g., a UEFI Hypertext Transfer Protocol (HTTP) network stack) to access evaluation server 90 on each boot or shutdown, to query for updates. This technique allows an agent outside of the OS to update the firmware and possibly recovery the OS or OS loader. This technique may be used on a cost-sensitive system that lacks a PME, for instance.

In addition or alternatively, evaluation server 90 may execute the RPE process to provide an OOB update. For instance, evaluation server 90 may do so in response to detecting that client 20 is not able to load all of the FIM and FRT modules (e.g., SF 30, VMM 70, OS 80, etc.). For example, client 20 may be unable to load at least one of those modules due to compromised security (e.g., malicious tampering that causes the system not to boot). Alternatively, client 20 may include a simple policy configuration that triggers OOB updates during idle or inactive periods.

In one embodiment, evaluation server 90 uses PME 50 and PME FIM 52 to read PME FRT 54 and to supply client 20 with an OOB update, based on PME FRT 54. For instance, PME 50 may serialize PME FRT 54 across the network to evaluation server 90, and evaluation server 90 may serialize a firmware update to PME 50 via PME FIM 52. Based on that update, PME 50 may then use a Serial Peripheral Interface (SPI) bus to update SF 30 in NVM 28 and to update embedded MultiMediaCard (eMMC) binaries.

The RPE process may be triggered by many different kinds of events. For instance, client 20 may initiate the RPE process when someone brings client 20 to a service center or when client 20 uses a pre-execution environment (PXE) boot process. For PXE boot, evaluation server 90 may act as the PXE server, or evaluation server 90 may evaluate the client FRT and FIMs and then notify a separate PXE server, which can update or provision appropriate firmware or OS images to client 20. Additional information about PXE boot is provided below. In addition or alternatively, evaluation server 90 can trigger the RPE process based on observed vulnerabilities, as indicated above. In addition or alternatively, client 20, evaluation server 90, or both may be configured for periodic updates (e.g. weekly).

As shown at block 310, the process of FIG. 3 may start with evaluation manager 92 in evaluation server 90 determining whether client 20 supports remote FRT evaluation. Evaluation manager 92 may make that determination based on information obtained from client 20. For instance, this can be done based on a remote challenge/response protocol between client 20 and evaluation server 90 using the credentials provisioned in client 20 during manufacturing process. Client 20 and evaluation server 90 may also configure their communication channel based on the challenge/response protocol for future communication. For instance, they may establish a transport layer security (TLS) session.

If evaluation manager 92 determines that client 20 does not support remote FRT evaluation, the process of FIG. 3 may end. However, if client 20 supports remote FRT evaluation, evaluation manager 92 may then identify the configuration of FIMs in client 20, as shown at block 312. For instance, evaluation manager 92 may use the communication channel established initially while discovering if client 20 supports remote FRT evaluation to obtain some or all of the data in FCT 38 from client 20 using SF FIM 32, and evaluation manager 92 may identify the configuration of FIMs based on that data.

As shown at block 320 and the associated blocks, evaluation manager 92 may then begin a process for verifying each of the FIMs of client 20. As shown at block 322, evaluation manager 92 performs remote attestation for each FIM. And as shown at blocks 330 and 332, if attestation fails, evaluation manager 92 may follow a predetermined policy for attestation failure. However, if attestation for an FIM succeeds, evaluation manager 92 may then use that FIM to obtain the FRT from the component associated with that FIM. Evaluation manager 92 may thus verify each FIM and use each verified FIM to obtain different versions of the FRT from different components in client 20.

After verifying FIMs and obtaining FRTs, evaluation manager 92 may begin evaluating the FRTs, the FIMs, and related data, to distinguish between FRTs and FIMs that are trustworthy and those that aren't. In one embodiment, as described in greater detail below, evaluation manager 92 uses a gradient boosting ranking principle with Byzantine agreement to select an appropriate FRT and an appropriate FIM.

For instance, as shown at block 340, evaluation manager 92 may apply gradient boosting to valid FIMs, based on any suitable attribute or combination of attributes associated with each FIM. Gradient boosting is a machine-learning technique that improves ranking scores of probabilistic equations. And as explained by the Wikipedia entry at en.wikipedia.org/wiki/Gradient_boosting, gradient boosting may be used for regression and classification problems to produce "a prediction model in the form of an ensemble of weak prediction models, typically decision trees. It builds the model in a stage-wise fashion like other boosting methods do, and it generalizes them by allowing optimization of an arbitrary differentiable loss function." Additional information on gradient boosting may be found on the www.microsoft.com website at the following address: en-us/research/publication/learning-to-rank-using-classificationand-gradient-boosting. For purposes of this disclosure, the results that evaluation manager 92 generates with the gradient-boosting (GB) algorithm may be referred to as "trustworthiness scores" or "GB scores."

When evaluation manager 92 applies gradient boosting, the attributes considered for each FIM may include the hardware capabilities of the component providing that FIM, the software version of the firmware for that component, the location of client 20, and other types of information. Evaluation manager 92 may obtain geo-fence attributes from client 20, and those geo-fence attributes may enable evaluation manager 92 to perform any geo-specific updates or upgrades to firmware or policies. For example, for a component that utilizes or supports elliptic curve cryptography (ECC), a region-specific elliptic curve (e.g., China vs. U.S.) can be detected or chosen. An example geo-fenced policy would be to enforce Health Insurance Portability and Accountability Act (HIPAA) compliancy in the U.S. but not in other locations. Evaluation manager 92 may determine at least some of the attributes of client 20 based on client information in FCT 38 or in the FRT from each component. That client information may describe the hardware capabilities of each component, along with location information for the client, for instance.

Also, evaluation manager 92 may occasionally or periodically monitor telemetry of the various components of client 20 (e.g. SF 30, PME 50, VMM 70, OS 80) to detect suspicious behaviors that may be indicative of an attack on those components or associated channels. Evaluation manager 92 may sample and verify FRTs across various FIMs periodically or based on any geo-specific threat intelligence that evaluation manager 92 obtains from external threat intelligence sources. Another trigger for evaluation manager 92 can be based on machine learning analytics (e.g. GB methodology) on observed data that may be crowd sourced from hundreds, thousands, or millions of clients.

During gradient boosting, evaluation manager 92 may assign different GB scores to different components, based on data reflecting the monitored behaviors. In other words, evaluation manager 92 may generate GB scores for each of the valid FIMs, based on factors such as those mentioned above. For purposes of this disclosure, a component to which evaluation manager 92 has assigned a GB score may be referred to as a "gradient-boosted component."

One illustrative example involves a client device with FIMs and FRTs provided by the following components: SF, a PME, an OS, a VMM, and an SMM. In that example, to generate GB scores for the client device, an evaluation server may generate a GB score for each of those FRT-enabled components, based on factors such as those mentioned above. Thus, the evaluation server may compute the following set of GB scores:

GB-SF,
GB-PME,
GB-OS,
GB-VMM, and
GB-SMM.

Also, as indicated below, evaluation manager 92 may use the GB scores to weight an evaluation of FRT tables with regard to trustworthiness.

For instance, as shown at block 342, evaluation manager 92 may use a Byzantine-fault-tolerance (BFT) algorithm to analyze the gradient-boosted components, to determine which of those components is least likely to have been compromised. Evaluation manager 92 may use the BFT algorithm to determine which FRT is most trustworthy, and therefore "best." Similarly, the component and the FIM that correspond to the best FRT may also be considered "best." As explained by the Wikipedia entry at en.wikipedia.org/wiki/Byzantine_fault_tolerance, "Byzantine fault tolerance is the characteristic of a system that tolerates the class of failures known as the Byzantine Generals' Problem,[ ] which is a generalized version of the Two Generals' Problem . . . . The objective of Byzantine fault tolerance is to be able to defend against Byzantine failures, in which components of a system fail with symptoms that prevent some components of the system from reaching agreement among themselves, where such agreement is needed for the correct operation of the system. Correctly functioning components of a Byzantine fault tolerant system will be able to provide the system's service, assuming there are not too many faulty components."

In one embodiment, the BFT algorithm computes a weight for each gradient-boosted component based solely on FRT content. For purposes of this disclosure, the results of the BFT algorithm may be referred to as "BFT scores." Building on the illustrative example introduced above, each of the FRT-enabled components in the client device maintains backup copies of old FRTs, such as SF-FRT(1), SF-FRT(2), . . . SF-FRT(n). In that example, to generate BFT scores for the client device, an evaluation server may generate a BFT score for each version of each FRT, based on how that FRT compares to some or all of the other FRTs. Thus, the evaluation server may compute the following set of BFT scores:

BFT-SF-1,
BFT-SF-2,
. . .
BFT-SF-n,
BFT-PME-1,
BFT-PME-2,
. . .
BFT-PME-n,
BFT-OS-1,
BFT-OS-2,
. . .
BFT-OS-n,
BFT-VMM-1,
BFT-VMM-2,
. . .
BFT-VMM-n,
BFT-SMM-1,
BFT-SMM-2,
. . .
BFT-SMM-n.

As shown at block 344, evaluation manager 92 may then use the BFT scores and the GB scores to determine which component is least likely to have been compromised. For instance, evaluation manager 92 may use the GB scores and the BFT scores to generate final trustworthiness (FT) scores for each component, and evaluation manager 92 may use the FT scores to determine which component is most likely to have an uncompromised FRT and an uncompromised FIM.

For illustration, in one embodiment, GB scores, BFT scores and FT scores may be calculated as follows:

GB score$(X)=\alpha M(X)+\beta N(X)+\gamma O(X)$+tolerable error

Where
X refers to an FRT under consideration,
M( ), N( ) and O( ) refer to error approximation functions,
Tolerable_error refers to the allowed tolerable error rate in the machine learning convergence (lower is better), and
$\alpha$, $\beta$, and $\gamma$ refer to the respective optimal weights.

BFT score$(X)=\text{MaxMatch}_i(\text{GB score}(X)), i=1 \ldots N$

Where
- X refers to an FRT under consideration, and
- MaxMatch is a function that returns the maximum match for the GB score among N entities.

$$\text{FT score} = F(\text{BFT score}(X\text{-}1), \text{BFT score}(X\text{-}2), \ldots \text{BFT score}(X\text{-}N)),$$

Where
- N represents the total number of FRTs under evaluation,
- X–1, X–2, . . . X–N represent respective FRTs, and
- F is a function that takes the individual BFT scores across all N FRTs and returns the most trusted FRT.

A hypothetical scenario that utilizes the above calculations may involve a distinct FRT for each of the following firmware modules: a TPM, a PME, a VMM, and SF. Also, in this hypothetical scenario, the VMM is compromised, but the other three modules are not. Consequently, all of the components other than the VMM may get the same GB score (e.g., "GB-Score-A"). And the VMM may get a different GB score (e.g., "GB-Score-B"). In other words:
- GB score (TPM)=GB-Score-A,
- GB score (PME)=GB-Score-A,
- GB score (SF)=GB-Score-A, and
- GB score (VMM)=GB-Score-B.

Consequently, the BFT score may select GB-Score-A as the MaxMatch. In other words, $$\text{BFT score} = \text{MaxMatch}(\text{GB-Score-A}_{TPM}, \text{GB-Score-A}_{PME}, \text{GB-Score-A}_{SF}, \text{GB-Score-B}_{VMM}) = \text{GB-Score-A}$$

As shown above for the hypothetical example under consideration, the GB score of "A" is the majority matching resulting in the BFT score for the four components being evaluated. Consequently, the final FT score in the above hypothetical example would be calculated as follows:

$$\text{FT score} = F(\text{BFT score}(X\text{-}1), \text{BFT score}(X\text{-}2), \ldots \text{BFT score}(X\text{-}N)) = A.$$

In other words, the FT score would indicate that (a) the TPM, the PME, and the SF all having matching FRTs; and (b) the matching FRT is more trustworthy than the FRT that doesn't match. In other words, the FT score would indicate that the matching FRT is the most trustworthy.

Furthermore, in embodiments which retain multiple versions of FRTs for each component, the evaluation server may be configured to calculate an FT score for each version of each FRT.

Evaluation manager 92 may be configured to apply different grading policies for different types or groups of clients. For instance, evaluation manager 92 may be configured to use majority matching for one group of clients, but for another group, evaluation manager 92 may also evaluate the upgrade history for each component, from first deployment of the client.

As shown at block 346, after identifying the most trustworthy FRT, evaluation manager 92 may then select updates for the firmware resources to be managed, based at least in part on (a) the information in that FRT and (b) policies or other information maintained by evaluation server 90 in client maintenance data 94. For instance, based on (a) the version information in the best FRT for the various firmware components in client 20 and (b) information in client maintenance data 94 identifying the newest versions for various firmware components, evaluation manager 92 may determine which components in client 20 should receive updated firmware. As shown at block 348, evaluation manager 92 may then send the selected updates to client 20 via the best FIM. Those updates may include policy updates and firmware updates.

For instance, evaluation manager 92 may determine that PME FIM 51 is the best FIM. Evaluation manager 92 may then determine that TPMF 41 is outdated, based on the version information for TPMF 41 in PME FRT 54. Consequently, evaluation manager 92 may use PME FIM 51 to send an update for the firmware in TPM 40 to client 20.

Furthermore, evaluation manager 92 may install additional policies for specific components of client 20. For instance, if the location of client 20 crosses a geo-fence boundary from a first zone (e.g., China) to second zone (e.g., U.S.), evaluation manager 92 may automatically configure client 20 to automatically enforce HIPAA. Evaluation manager 92 may use any suitable techniques to determine the location of a client, including without limitation information from a global positioning system (GPS) module in the client or manufacturing-provisioned data such as an International Mobile Equipment Identity (IMEI). Also, evaluation manager 92 may provide upgrade packages for different locations or geos. For example, evaluation manager 92 may select an appropriate package for upgrade based on the identified geo of client 20.

The process of FIG. 3 may then end.

Thus, evaluation manager 92 may use the BFT algorithm to decide which of multiple FRTs to trust. For instance, evaluation manager 92 may interact with an OS-based updater, an SF-based updater, a PME-based updater, etc., to get different instances of an FRT, and evaluation manager 92 may decide which of those FRTs are trustworthy and which are not. For example, evaluation manager 92 may compare FRT values obtained from each source to see if malware has tamper with an FRT. Furthermore, when evaluating FRTs or FIMs, evaluation manager 92 may use multiple decision criteria, including without limitation security, bandwidth, and geo-fenced proximity.

Additionally, to avoid the overhead of event-based checking, (e.g., checking every boot, every shutdown, every sleep (or S3), etc.), client 20 can be configured with a timer, and client 20 may check for updates only when the timer expires (e.g., periodically). For instance, as indicated above, client 20 may check for updates weekly. In addition or alternatively, client 20 may check for updates on the basis of events and timers (e.g., on the next boot after the timer expires). For instance, OS 80 may include an agent that checks with evaluation server 90 based on a timer service, etc.

In one embodiment, operations such as those described above are used in connection with a PXE boot process. For instance, as part of the PXE boot process, SF 30 in client 20 may broadcast a Dynamic Host Configuration Protocol (DHCP) discover request, and evaluation manager 92 may respond with a DHCP offer. In response, SF 30 may then send the GUIDs of the different FRTs to evaluation manager 92. For instance, SF 30 may send some or all of the data in FCT 38 to evaluation manager 92. Evaluation manager 92 may then use those GUIDs to discover the updatable elements in client 20 and to determine which updates should be applied, if any. Evaluation manager 92 may then use Trivial File Transfer Protocol (TFTP) file writes or HTTP posts to apply those firmware updates to client 20.

As has been described, evaluation manager 92 may use multiple different configuration paths to obtain multiple copies of the FRT, and evaluation manager 92 may use Byzantine agreement to address undecidability. The configuration paths may include without limitation PME FIM 52, VMM FIM 72, OS FIM 83, SMM FIM 62, etc. In one embodiment, SMI transfer monitor (STM) 66 uses Intel® Trusted Execution Technology (TXT) to provide SMM FIM 62. In other embodiments, clients may use other technologies to provide SMM FIM paths.

Furthermore, in band and OOB agents can update things like UEFI revocation lists for secure-boot forbidden signature databases.

The present teachings may be used to address security gaps and to provide multiple layers of security defense. For instance, a malicious user might need to compromise all of the trusted components of a client device (e.g., a PME module, a TPM, a VMM module, an OS module, and an SF module) in order to take over.

Figure 4A:
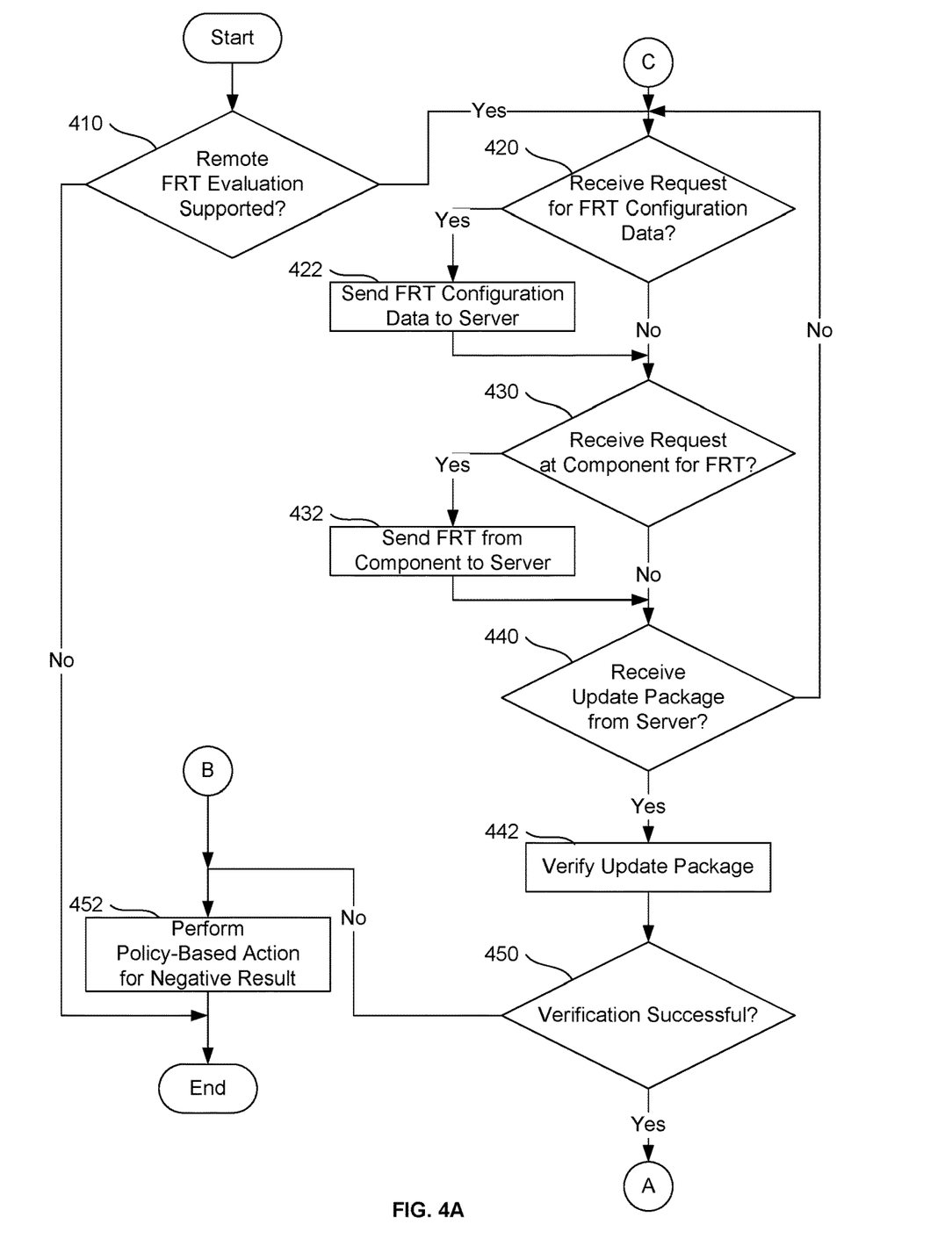
FIGS. 4A and 4B present a flowchart of an example process for managing firmware resources in the client device of FIG. 1, primarily from the perspective of the client device.
Figure 4B:
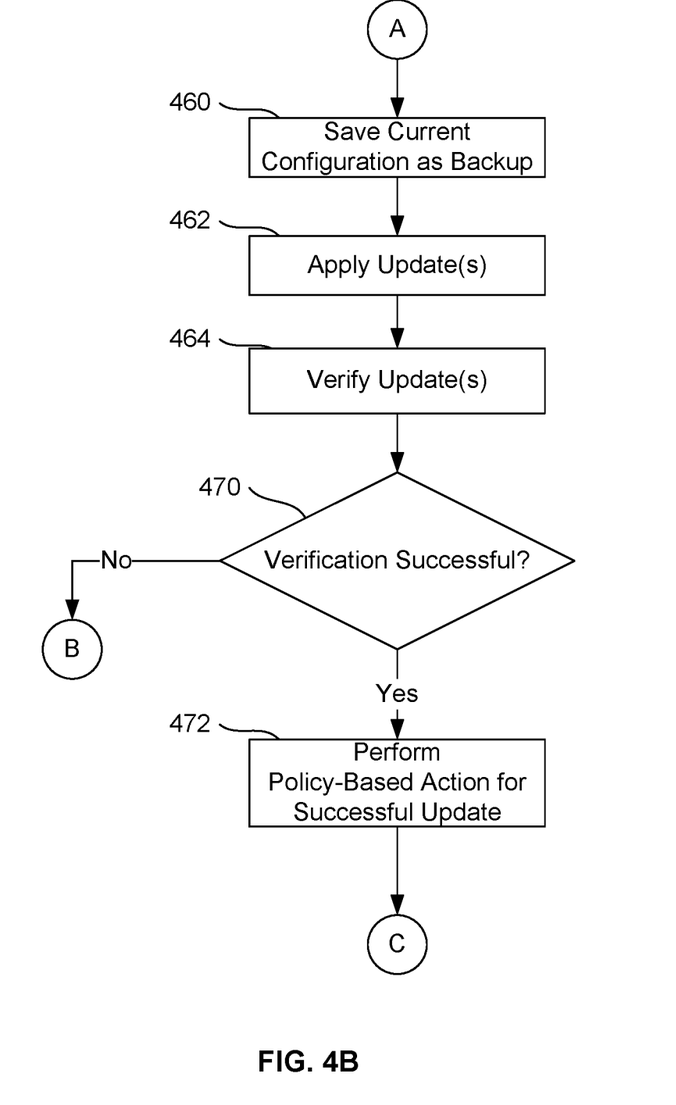

FIGS. 4A and 4B present a flowchart for managing firmware resources, primarily from the perspective of client device 20. That process may start in response to any suitable trigger event, including boot or shut down of client 20, expiration of a timer, etc., as indicted above. As shown at block 410, SF 30 in client 20 may start the process by determining whether client 20 supports remote FRT evaluation. In addition or alternatively, components within a TEE may perform the operations specified for SF 30.

If remote FRT evaluation is not supported, the process of FIGS. 4A and 4B may end. If remote FRT evaluation is supported, SF 30 may then determine whether client 20 has received a request from a remote evaluation server (e.g., evaluation server 90) for platform FIM or FRT configuration data, as shown at block 420. As shown at block 422, if client 20 has received a request FRT configuration data, SF 30 may send the requested data to the server.

As shown at block 430, each component within client 20 then determines whether that component has received a request from a server for that component's RFT. If so, the component uses its FIM to send its FRT to the server, as shown at block 432. For instance, PME 50 may receive a request for an FRT from evaluation server 90 via PME FIM 52, and in response, PME may send PME FRT 54 to evaluation server 90.

Then, as shown at block 440, any FRT-enabled component may then determine whether that component has received an update package from the server. As indicated above with regard to FIG. 3, the server may evaluate the current configuration of client 20 to identify the most trustworthy or best FRT for client 20, and the server may use the corresponding FIM to send that update to client 20. If no update package has been received, the process may return to block 420, with client 20 watching for requests for FRT configuration data, etc., as indicated above. If an update package has been received by a component, that component may then verify the update package, as shown at block 442. To verify the update, the component may perform checksum verification or signature verification, for instance.

As shown at block 452, of the update fails verification, the component may take a predetermined policy action, and the process may then end without the update being applied. However, if the update passes verification, the process may pass from FIG. 4A through page connector A to FIG. 4B, and the component that received the update may save the current configuration as backup, as shown at block 460. For instance, if OS 80 receives the update, OS 80 may save the current OS FRT 84 as the (soon to be) previous FRT. As shown at block 462, the component may then apply the update.

For instance, in the scenario describe above, in which PME 50 receives an update for the firmware in TPM 40, PME 50 may apply that update to TPM 40 in block 462.

As shown at block 464, the component that received the update may then verify the update. If verification fails, the component that received the update may take a predetermined policy-based action, as shown at blocks 470 and 452. But if verification succeeds, the component that received the update may take a different predetermined policy-based action, as shown at block 472. For instance, the predetermined policy-based action for successful update and verification of SF 30 may be (a) to update the FRTs in each of the FRT-enabled components; (b) to perform record keeping activity in terms of date, location, type of update, previous version, current version being updated, etc.; and (c) to reset client 20. For example, resetting client 20 may cause client 20 to execute a secure boot process, and as part of that process, SF 30 may verify each of the FRT-enabled components, and SF 30 may then cause each of those components to update its current FRT to reflect the new version that was just applied, and to backup the component's previous FRT. In addition or alternatively, evaluation server 90 could push new FRTs to each FRT-enabled component in client 20, to synchronize those FRTs, whenever evaluation server 90 determines that one or more FRT-enabled components has an outdated or invalid FRT.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. And software that is used during the boot process may be referred to as firmware. Software that is stored in non-volatile memory may also be referred to as firmware. In addition, terms like "program" and "module" may be used in general to cover a broad range of software constructs, including applications, routines, drivers, subprograms, processes, and other types of software components. Any suitable operating environment and programming language (or combination of operating environments and programming languages) may be used to implement software components described herein.

Alternative embodiments include machine accessible media encoding instructions or control logic for performing the operations described herein. Such embodiments may also be referred to as program products. Such machine accessible media may include, without limitation, tangible storage media such as magnetic disks, optical disks, RAM, read-only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

In at least one embodiment, the instructions for all relevant components may be stored in one non-transitory machine accessible medium. In at least one other embodiment, two or more non-transitory machine accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines. Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

The present teachings may be used to advantage in many different kinds of data processing systems. Example data processing systems may include, without limitation, systems on a chip (SOCs), wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with technology for operating as a remote evaluation server. The data processing system comprises a processor, at least one machine-accessible medium responsive to the processor, and an evaluation manager stored at last partially in the at least one machine-accessible medium. The evaluation manager, when executed by the processor, enables the data processing system to (a) use a first interface that is provided by system firmware of a client device to obtain a first firmware resource table (FRT) from the client device, (b) use a second interface that is provided by a component of the client device other than the system firmware to obtain a second FRT from the client device, (c) use the first and second FRTs to automatically identify a trustworthy FRT among the first and second FRTs, and (d) use the trustworthy FRT to automatically determine whether the client device should be updated.

Example A2 is a data processing system according to Example A1, wherein the operation of using the trustworthy FRT to automatically determine whether the client device should be updated comprises: using the trustworthy FRT to automatically determine whether firmware in the client device should be updated.

Example A3 is a data processing system according to Example A1, wherein the evaluation manager, when executed by the processor, enables the data processing system to (a) automatically select the interface among the first and second interfaces that was used to obtain the trustworthy FRT from the client device as a trustworthy interface; and (b) in response to determining that the client device should be updated, automatically use the trustworthy interface to send an update to the client device. Example A3 may also include the features of Example A2.

Example A4 is a data processing system according to Example A3, wherein (a) the operation of automatically using the trustworthy FRT to determine whether the client device should be updated comprises determining that the system firmware should be updated, and (b) the operation of automatically using the trustworthy interface to send an update to the client device comprises using the second interface provided by the component other than the system firmware to send an update for the system firmware to the client device.

Example A5 is a data processing system according to Example A1, wherein the evaluation manager enables the data processing system to obtain the first and second FRTs from the client device automatically, in response to a call from the system firmware of the client device. Example A5 may also include the features of any one or more of Examples A2 through A4.

Example A6 is a data processing system according to Example A1, wherein the second interface is provided by an operating system of the client device. Also, the evaluation manager enables the data processing system to obtain the first and second FRTs from the client device automatically, in response to a call from the operating system of the client device. Example A6 may also include the features of any one or more of Examples A2 through A5.

Example A7 is a data processing system according to Example A1, wherein the second interface is provided by a persistent management engine (PME) of the client device. Also, the evaluation manager enables the data processing system to obtain the first and second FRTs from the client device automatically, in response to a call from the PME of the client device. Example A7 may also include the features of any one or more of Examples A2 through A6.

Example A8 is a data processing system according to Example A1, wherein the evaluation manager enables the data processing system to initiate communications to obtain the first and second FRTs from the client device as part of an update push process. Example A8 may also include the features of any one or more of Examples A2 through A7.

Example A9 is a data processing system according to Example A1, wherein the evaluation manager enables the data processing system to operate as part of a data center that also includes the client device. Example A9 may also include the features of any one or more of Examples A2 through A8.

Example B1 is a data processing system with technology for cooperating with a remote evaluation server. The data processing system comprises at least one non-transitory machine-accessible medium and at least first and second firmware resource tables (FRTs) stored in the at least one machine-accessible medium. The data processing system further comprises a first component to provide a first interface to the first FRT, wherein (a) the first component comprises system firmware, (b) the first FRT identifies multiple firmware modules in the computer, and (c) the first interface enables a remote evaluation server to obtain the first FRT from the data processing system. The data processing system further comprises a second component to provide a second interface to the second FRT, wherein (a) the second component is a component other than the system firmware, (b) the second FRT also identifies multiple firmware modules in the computer, and (c) the second interface enables a remote evaluation server to obtain the second FRT from the data processing system. At least one of the first and second interfaces enables the data processing system to receive a firmware update from the remote evaluation server after the remote evaluation server has (a) evaluated the first and second FRTs for trustworthiness, (b) selected a trustworthy FRT among the first and second FRTs, and (c) selected a firmware update for at least one of the firmware modules based on the trustworthy FRT.

Example B2 is a data processing system according to Example B1, wherein at least one of the FRTs comprises a firmware versioning archive (FVA) that identifies a sequence of changes to at least one updated firmware module, wherein the FVA comprises date information and version information for at least two of the changes to the updated firmware module, and wherein the version information comprises version information for the updated firmware module and version information for at least one additional firmware module.

Example B3 is a data processing system according to Example B1, wherein the firmware update comprises a system firmware update, and the operation of receiving the firmware update from the remote evaluation server comprises receiving the system firmware update via the second interface that is provided by the component of the client device other than the system firmware. Also, at least one of the components of the data processing system enables the data processing system to automatically use the system firmware update that was received via the second interface to update the system firmware. Example B3 may also include the features of Example B2.

Example B4 is a data processing system according to Example B1, further comprising an FRT configuration table (FCT) that is protected by a trusted execution environment, wherein the FCT identifies the first and second FRTs. Example B4 may also include the features of any one or more of Examples B2 and B3.

Example C1 is an apparatus to enable a data processing system to operate as a remote evaluation server. The apparatus comprises at least one non-transitory machine-accessible storage medium, and an evaluation manager stored at last partially in the at least one machine-accessible medium. The evaluation manager, when executed by a data processing system, enables the data processing system to (a) use a first interface that is provided by system firmware of a client device to obtain a first firmware resource table (FRT) from the client device, (b) use a second interface that is provided by a component of the client device other than the system firmware to obtain a second FRT from the client device, (c) use the first and second FRTs to automatically identify a trustworthy FRT among the first and second FRTs, and (d) use the trustworthy FRT to automatically determine whether the client device should be updated.

Example C2 is an apparatus according to Example C1, wherein the operation of using the trustworthy FRT to automatically determine whether the client device should be updated comprises using the trustworthy FRT to automatically determine whether firmware in the client device should be updated.

Example C3 is an apparatus according to Example C1, wherein the evaluation manager, when executed by the data processing system, enables the data processing system to (a) automatically select the interface among the first and second interfaces that was used to obtain the trustworthy FRT from the client device as a trustworthy interface; and (b) in response to determining that the client device should be updated, automatically use the trustworthy interface to send an update to the client device. Example C3 may also include the features of Example C2.

Example C4 is an apparatus according to Example C3, the operation of automatically using the trustworthy FRT to determine whether the client device should be updated comprises determining that the system firmware should be updated. Also, the operation of automatically using the trustworthy interface to send an update to the client device comprises using the second interface provided by the component other than the system firmware to send an update for the system firmware to the client device.

Example D1 is an automated for distributed and redundant firmware evaluation. The method comprises using a first interface that is provided by system firmware of a client device to obtain, at an evaluation server, a first firmware resource table (FRT) from the client device; and using a second interface that is provided by a component of the client device other than the system firmware to obtain, at the evaluation server, a second FRT from the client device. The method further comprises, at the evaluation server, (a) automatically using the first and second FRTs to identify a trustworthy FRT among the first and second FRTs, and (b) automatically using the trustworthy FRT to determine whether the client device should be updated.

Example D2 is a method according to Example D1, wherein the operation of automatically using the trustworthy FRT to determine whether the client device should be updated comprises automatically using the trustworthy FRT to determine whether firmware in the client device should be updated.

Example D3 is a method according to Example D1, further comprising, (a) at the evaluation server, automatically selecting the interface among the first and second interfaces that was used to obtain the trustworthy FRT from the client device as a trustworthy interface; and (b) in response to determining that the client device should be updated, automatically using the trustworthy interface to send an update to the client device. Example D3 may also include the features of Example D2.

Example D4 is a method according to Example D3, wherein (a) the operation of automatically using the trustworthy FRT to determine whether the client device should be updated comprises determining that the system firmware should be updated, and (b) the operation of automatically using the trustworthy interface to send an update to the client device comprises using the second interface provided by the component other than the system firmware to send an update for the system firmware to the client device.

Example D5 is a method according to Example D1, wherein the evaluation server obtains the first and second FRTs from the client device automatically, in response to a call from the system firmware of the client device. Example D5 may also include the features of any one or more of Examples D2 through D4.

Example D6 is a method according to Example D1, wherein (a) the second interface is provided by an operating system of the client device; and (b) the evaluation server obtains the first and second FRTs from the client device automatically, in response to a call from the operating system of the client device. Example D6 may also include the features of any one or more of Examples D2 through D5.

Example D7 is a method according to Example D1, wherein (a) the second interface is provided by a persistent management engine (PME) of the client device; and (b) the evaluation server obtains the first and second FRTs from the client device automatically, in response to a call from the PME of the client device. Example D7 may also include the features of any one or more of Examples D2 through D6.

Example D8 is a method according to Example D1, wherein the evaluation server initiates communications to obtain the first and second FRTs from the client device as part of an update push process. Example D8 may also include the features of any one or more of Examples D2 through D7.

Example D9 is a method according to Example D1, wherein the client device is part of a data center, and the evaluation server is part of the data center. Example D9 may also include the features of any one or more of Examples D2 through D8.

Example D10 is a method according to Example D1, wherein the operation of automatically using the first and second FRTs to identify a trustworthy FRT among the first and second FRTs comprises using machine learning with Byzantine agreement to distinguish between trustworthy FRTs and untrustworthy FRTs. Also, at least one of the FRTs comprises location data for the client device. Also, the operation of automatically using the trustworthy FRT to determine whether the client device should be updated comprises using the location data to determine whether client device should receive a geo-specific update. Example D10 may also include the features of any one or more of Examples D2 through D9.

Example D11 is a method according to Example D1, further comprising (a) storing the first and second FRTs in the client device, (b) using the first interface that is provided by system firmware in the client device to send the first FRT from the client device to the remote evaluation server, and (c) using the second interface that is provided by component of the client device other than system firmware to send the second FRT from the client device to the remote evaluation server. The method further comprises, after the remote evaluation server has (a) evaluated the first and second FRTs for trustworthiness, (b) selected a trustworthy FRT among the first and second FRTs, and (c) selected a firmware update for at least one of the firmware modules based on the trustworthy FRT, receiving the firmware update from the remote evaluation server at the client device. Example D11 may also include the features of any one or more of Examples D2 through D10.

Example E1 is an automated method for distributed and redundant firmware evaluation. The method comprises (a) storing at least first and second firmware resource tables (FRTs) in a client device, wherein each of the FRTs identifies multiple firmware modules in the computer; (b) using a first interface that is provided by system firmware in the client device to provide a remote evaluation server with the first FRT; and (c) using a second interface that is provided by a component of the client device other than the system firmware to provide the remote evaluation server with the second FRT. The method further comprises, after the remote evaluation server has (a) evaluated the first and second FRTs for trustworthiness, (b) selected a trustworthy FRT among the first and second FRTs, and (c) selected a firmware update for at least one of the firmware modules based on the trustworthy FRT, receiving the firmware update from the remote evaluation server.

Example E2 is a method according to Example E1, wherein the operation of receiving the firmware update from the remote evaluation server comprises, after the remote evaluation server has automatically selected the interface among the first and second interfaces that was used to obtain the trustworthy FRT from the client device as a trustworthy interface, receiving the firmware update from the remote evaluation server via the trustworthy interface.

Example E3 is a method according to Example E1, further comprising automatically using the firmware update from the remote evaluation server to update the firmware module that corresponds to said firmware update. Example E3 may also include the features of Example E1.

Example E4 is a method according to Example E1, wherein the firmware update comprises a system firmware update, and the operation of receiving the firmware update from the remote evaluation server comprises receiving the system firmware update via the second interface that is provided by the component of the client device other than the system firmware, The method further comprises automatically using the system firmware update that was received via the second interface to update the system firmware. Example E4 may also include the features of any one or more of Examples E2 and E3.

Example F is at least one machine-accessible medium comprising computer instructions to support remote firmware evaluation. The computer instructions, in response to being executed in a device, enable the device to perform a method according to any of Examples D1 through E4.

Example G is a data processing system with technology to support remote firmware evaluation. The data processing system comprises a processing element and at least one machine-accessible medium responsive to the processing element. The data processing system also comprises computer instructions stored at least partially in the at least one machine-accessible medium, wherein the computer instructions, in response to being executed, enable the data processing system to perform a method according to any of Examples D1 through E4.

Example H is a data processing system with technology to support remote firmware evaluation. The data processing system comprises means for performing the method of any one of Examples D1 through E4.

What is claimed is:

1. A data processing system with technology for operating as a remote evaluation server, the data processing system comprising:
   a processor;
   at least one machine-accessible medium responsive to the processor; and
   an evaluation manager stored at last partially in the at least one machine-accessible medium, wherein the evaluation manager, when executed by the processor, enables the data processing system to:
      use a first interface that is provided by system firmware of a client device to obtain a first firmware resource table (FRT) from the client device, wherein the first FRT identifies multiple firmware modules in the client device;
      use a second interface that is provided by a component of the client device other than the system firmware to obtain a second FRT from the client device, wherein the second FRT identifies multiple firmware modules in the client device;
      use the first and second FRTs to automatically identify a trustworthy FRT among the first and second FRTs; and
      use the trustworthy FRT to automatically determine whether the client device should be updated.

2. A data processing system according to claim 1, wherein the evaluation manager, when executed by the processor, enables the data processing system to: automatically select the interface among the first and second interfaces that was used to obtain the trustworthy FRT from the client device as a trustworthy interface; and in response to determining that the client device should be updated, automatically use the trustworthy interface to send an update to the client device.

3. A data processing system according to claim 2, wherein: the operation of automatically using the trustworthy FRT to determine whether the client device should be updated comprises determining that the system firmware should be updated; and the operation of automatically using the trustworthy interface to send an update to the client device comprises using the second interface provided by the component other than the system firmware to send an update for the system firmware to the client device.

4. A data processing system according to claim 1, wherein: the second interface is provided by an operating system of the client device; and the evaluation manager enables the data processing system to obtain the first and second FRTs from the client device automatically, in response to a call from the operating system of the client device.

5. A data processing system according to claim 1, wherein: the second interface is provided by a persistent management engine (PME) of the client device; and the evaluation manager enables the data processing system to obtain the first and second FRTs from the client device automatically, in response to a call from the PME of the client device.

6. A data processing system according to claim 1, wherein: the evaluation manager enables the data processing system to initiate communications to obtain the first and second FRTs from the client device as part of an update push process.

7. A data processing system according to claim 1, wherein the evaluation manager enables the data processing system to operate as part of a data center that also includes the client device.

8. A data processing system with technology for cooperating with a remote evaluation server, the data processing system comprising:
   at least one non-transitory machine-accessible medium;
   at least first and second firmware resource tables (FRTs) stored in the at least one machine-accessible medium, wherein each of the FRTs identifies multiple firmware modules in the data processing system;
   a first component to provide a first interface to the first FRT, wherein (a) the first component comprises system firmware, and (b) the first interface enables a remote evaluation server to obtain the first FRT from the data processing system; and
   a second component to provide a second interface to the second FRT, wherein (a) the second component is a component other than the system firmware, and (b) the second interface enables a remote evaluation server to obtain the second FRT from the data processing system; and
   wherein at least one of the first and second interfaces enables the data processing system to receive a firmware update from the remote evaluation server after the remote evaluation server has (a) evaluated the first and second FRTs for trustworthiness, (b) selected a trustworthy FRT among the first and second FRTs, and (c) selected a firmware update for at least one of the firmware modules based on the trustworthy FRT.

9. A data processing system according to claim 8, wherein: at least one of the FRTs comprises a firmware versioning archive (FVA) that identifies a sequence of changes to at least one updated firmware module; wherein the FVA comprises date information and version information for at least two of the changes to the updated firmware module; and wherein the version information comprises version information for the updated firmware module and version information for at least one additional firmware module.

10. A data processing system according to claim 8, wherein: the firmware update comprises a system firmware update; the operation of receiving the firmware update from the remote evaluation server comprises receiving the system firmware update via the second interface that is provided by the component of the client device other than the system firmware; and at least one of the components of the data processing system enables the data processing system to automatically use the system firmware update that was received via the second interface to update the system firmware.

11. A data processing system according to claim 8, further comprising: an FRT configuration table (FCT) that is protected by a trusted execution environment, wherein the FCT identifies the first and second FRTs.

12. An apparatus to enable a data processing system to operate as a remote evaluation server, the apparatus comprising:
at least one non-transitory machine-accessible storage medium; and
an evaluation manager stored at last partially in the at least one machine-accessible medium, wherein the evaluation manager, when executed by a data processing system, enables the data processing system to:
use a first interface that is provided by system firmware of a client device to obtain a first firmware resource table (FRT) from the client device, wherein the first FRT identifies multiple firmware modules in the client device;
use a second interface that is provided by a component of the client device other than the system firmware to obtain a second FRT from the client device, wherein the second FRT identifies multiple firmware modules in the client device;
use the first and second FRTs to automatically identify a trustworthy FRT among the first and second FRTs; and
use the trustworthy FRT to automatically determine whether the client device should be updated.

13. An apparatus according to claim 12, wherein the operation of using the trustworthy FRT to automatically determine whether the client device should be updated comprises: using the trustworthy FRT to automatically determine whether firmware in the client device should be updated.

14. An apparatus according to claim 12, wherein the evaluation manager, when executed by the data processing system, enables the data processing system to: automatically select the interface among the first and second interfaces that was used to obtain the trustworthy FRT from the client device as a trustworthy interface; and in response to determining that the client device should be updated, automatically use the trustworthy interface to send an update to the client device.

15. An apparatus according to claim 14, wherein: the operation of automatically using the trustworthy FRT to determine whether the client device should be updated comprises determining that the system firmware should be updated; and the operation of automatically using the trustworthy interface to send an update to the client device comprises using the second interface provided by the component other than the system firmware to send an update for the system firmware to the client device.

16. An automated method for distributed and redundant firmware evaluation, the method comprising:
using a first interface that is provided by system firmware of a client device to obtain, at an evaluation server, a first firmware resource table (FRT) from the client device, wherein the first FRT identifies multiple firmware modules in the client device;
using a second interface that is provided by a component of the client device other than the system firmware to obtain, at the evaluation server, a second FRT from the client device, wherein the second FRT identifies multiple firmware modules in the client device;
at the evaluation server, automatically using the first and second FRTs to identify a trustworthy FRT among the first and second FRTs; and
at the evaluation server, automatically using the trustworthy FRT to determine whether the client device should be updated.

17. A method according to claim 16, wherein the operation of automatically using the trustworthy FRT to determine whether the client device should be updated comprises: automatically using the trustworthy FRT to determine whether firmware in the client device should be updated.

18. A method according to claim 16, further comprising: at the evaluation server, automatically selecting the interface among the first and second interfaces that was used to obtain the trustworthy FRT from the client device as a trustworthy interface; and in response to determining that the client device should be updated, automatically using the trustworthy interface to send an update to the client device.

19. A method according to claim 18, wherein: the operation of automatically using the trustworthy FRT to determine whether the client device should be updated comprises determining that the system firmware should be updated; and the operation of automatically using the trustworthy interface to send an update to the client device comprises using the second interface provided by the component other than the system firmware to send an update for the system firmware to the client device.

20. A method according to claim 16, wherein the evaluation server obtains the first and second FRTs from the client device automatically, in response to a call from the system firmware of the client device.

21. A method according to claim 16, wherein: the second interface is provided by an operating system of the client device; and the evaluation server obtains the first and second FRTs from the client device automatically, in response to a call from the operating system of the client device.

22. A method according to claim 16, wherein: the second interface is provided by a persistent management engine (PME) of the client device; and the evaluation server obtains the first and second FRTs from the client device automatically, in response to a call from the PME of the client device.

23. A method according to claim 16, wherein: the evaluation server initiates communications to obtain the first and second FRTs from the client device as part of an update push process.

24. A method according to claim 16, wherein: the operation of automatically using the first and second FRTs to identify a trustworthy FRT among the first and second FRTs comprises using machine learning with Byzantine agreement to distinguish between trustworthy FRTs and untrustworthy FRTs; at least one of the FRTs comprises location data for the client device; and the operation of automatically using the trustworthy FRT to determine whether the client device should be updated comprises using the location data to determine whether client device should receive a geo-specific update.

25. A method according to claim 16, further comprising: storing the first and second FRTs in the client device; using the first interface that is provided by system firmware in the client device to send the first FRT from the client device to the remote evaluation server; using the second interface that is provided by component of the client device other than system firmware to send the second FRT from the client device to the remote evaluation server; and after the remote evaluation server has (a) evaluated the first and second FRTs for trustworthiness, (b) selected a trustworthy FRT among the first and second FRTs, and (c) selected a firmware update for at least one of the firmware modules based on the trustworthy FRT, receiving the firmware update from the remote evaluation server at the client device.

* * * * *